United States Patent [19]
Strauss et al.

[11] Patent Number: 5,864,612
[45] Date of Patent: Jan. 26, 1999

[54] CALLER SELECTIVE IDENTIFICATION FOR TELEPHONE CALLS

[75] Inventors: Michael J. Strauss, Potomac, Md.; Robert D. Farris, Sterling, Va.

[73] Assignee: Bell Atlantic Network Services, Inc., Arlington, Va.

[21] Appl. No.: 725,349

[22] Filed: Oct. 1, 1996

[51] Int. Cl.⁶ .......................... H04M 1/56; H04M 15/06
[52] U.S. Cl. .......................... 379/142; 379/229; 379/230; 379/201
[58] Field of Search .......................... 379/67, 142, 229, 379/230, 112, 113, 220, 245, 257, 130, 118, 201

[56] References Cited

U.S. PATENT DOCUMENTS

| | | |
|---|---|---|
| 4,551,581 | 11/1985 | Doughty. |
| 4,582,956 | 4/1986 | Doughty. |
| 5,161,181 | 11/1992 | Zwick. |
| 5,274,699 | 12/1993 | Ranz. |
| 5,497,414 | 3/1996 | Bartholomew. |
| 5,533,106 | 7/1996 | Blumhardt ............................. 379/142 |
| 5,590,184 | 12/1996 | London ................................. 379/142 |
| 5,668,852 | 9/1997 | Holmes ................................. 379/142 |
| 5,696,815 | 12/1997 | Smyk ................................... 379/142 |
| 5,771,283 | 6/1998 | Chang et al. ......................... 379/142 |
| 5,781,621 | 7/1998 | Lim et al. ............................ 379/142 |
| 5,784,444 | 7/1998 | Snyder et al. ......................... 379/142 |

*Primary Examiner*—Curtis A. Kuntz
*Assistant Examiner*—Rexford N. Barnie
*Attorney, Agent, or Firm*—McDermott, Will & Emery

[57] ABSTRACT

The advanced intelligent network (GAIN) is used to allow a calling party to specify what caller ID information to send to the called party for display. The telephone system Line Identification Data Base (LIB) contains listings for subscribers that may each include a plurality of assigned telephone numbers and names. On an individual call basis, a calling subscriber can control what information is to be extracted from LIB for identification to the called party. Various identification options may be pre-established, the caller invoking a selected option by dialing a corresponding access code with the dialed telephone number.

21 Claims, 5 Drawing Sheets

CALLER SELECTIVE IDENTIFICATION FOR TELEPHONE CALLS

TECHNICAL FIELD

The present invention relates to telephone systems that convey caller line identification information to called parties and, more particularly, to enabling the calling party selective control with each call over specific information to be conveyed.

BACKGROUND ART

Caller ID is a telephone on-hook capability that provides a called party with information about the caller before the incoming call is answered. Conventionally, such information includes the date and time of the call and the caller's telephone number. A data message, preceded by a channel seizure signal, is sent in conjunction with the ringing signal from the central office to the called party during the silent interval after the first 20-Hz, 2-second ringing phase.

Caller ID service is designed for use with the voice portion of existing loop connections. The digitally formatted message is transmitted through a stream of data bits of standardized digital format. The message is sent once, without retransmission capability. The channel seizure signal, sent at the beginning of each message to alert the called party equipment of the coming information through physical connection of an appropriate interface, is typically composed of thirty continuous bytes of octal 125 (i.e., 01010101), or 250 milliseconds of a 600-Hz square wave. Transmission of data follows thereafter and is completed prior to the next 20-Hz ringing signal. For a detailed description of the method and apparatus for sending the data message, reference is made to U.S. Pat. No. 4,551,581 issued to Doughy on Nov. 5, 1985.

The receiving display apparatus at a caller ID subscriber location may be as disclosed in U.S. Pat. No. 4,582,956, issued Apr. 15, 1986. The apparatus, which may be a part of a telephone instrument or a stand-alone device, includes a line interface unit, a converter, a control circuit and a display unit. A frequency shift keyed (ASK) signal representing the special service information is filtered from the ringing signals by the line interface unit. The converter detects the ASK signal and demodulates the special service information from the ASK signal. Following detection of the ASK signal, the control circuit receives and stores the special service information. The stored information is periodically sent to the display unit to begin exhibiting thereof during the silent interval before the next ringing signal.

A problem in identifying a caller in a commercial environment, such as a fleet of vehicles having mobile telephones, is recognized in U.S. Pat. No. 5,274,699, issued to Ran on Dec. 29, 1993. As different drivers often operate vehicles at different times, transmission of a vehicle ID to a dispatcher, for example, would identify the vehicle but not the user. To overcome this problem, each mobile communication unit includes a keyboard and enhanced display to enable the caller to substitute an "alias ID" for the vehicle phone ID. Before placing a call, the user can display all stored alias ID information, select or edit an alias ID or choose not to transmit an alias ID, and then initiate communication through wireless transmission with another mobile communication unit or dispatcher.

The caller ID service in the public switched telephone network (PST) offers several advantages to the called party subscriber. Identification of the calling party, as provided by the caller ID service, allows the called party to screen an incoming call personally before its completion and thereby to decide whether or not it is desirable to answer the call. Nuisance calls, such as advertising and solicitation calls, can be avoided if the identity of the caller is determined beforehand. Knowledge of caller identity also serves as a resource for dealing with and curtailing harassment calls.

Reference is made to U.S. Pat. No. 5,497,414, issued to Bartholomew on Mar. 5, 1996, for a discussion of the advantages to the called party subscriber as well as the countersinking disadvantageous effects on the caller's privacy. If the caller number identity is made known to a called party caller ID subscriber each time a call is made, the privacy afforded to a caller having an unlisted number is significantly compromised. Similarly, any caller may find it desirable to place a call without revealing origination identity to the called party. In such case, the caller must take the risk that the called party line does not subscribe to the caller ID service.

As a recourse, the caller in some existing systems is given the option to block transmission of caller line origination identity to the called party. If the called party is a caller ID service subscriber, the display unit will either indicate a caller privacy condition or remain blank. Reference is made to U.S. Pat. No. 5,161,181, issued to Zwick on Nov. 3, 1992, for discussion of this concept. With caller ID blocked, a call is directed to the called party for completion in the standard manner and the functionality of caller ID is lost, along with its advantages to the called party subscriber. The caller can thus retain anonymity with an increased likelihood that the called party will elect not to answer the call.

Accommodating the requirements of called party subscribers to screen the origination of incoming calls before answering, while permitting calling subscribers to individually control what origination information will be transmitted for placed calls, is an ongoing concern of service providers. Enhancements to the basic caller ID service have further complicated these considerations.

With one such enhancement the network provides the caller's name as well as the caller's number for display at the caller ID box of the called party. The phrase "enhanced service" as used hereinafter refers to the capability of supplying both text and telephone caller identification information. A caller who blocks caller ID to avoid a return call from the called party may find benefit in transmitting the name information alone for identification purposes. Conventionally, the ability to transmit name information without originating telephone number information is not available. Moreover, the provision of additional caller ID information increases the risk that misleading information will be transmitted. For example, a call may be placed from a subscriber location at which several people reside. If the caller is not the listed subscriber, the called party may not recognize the identified caller name and choose not to answer the call. Identification of the name of the actual caller instead of the name of the subscriber is a function that prior art telephone systems lack. Such a function would be a benefit both to the called party, who may know the called party and thus answer the call, and the calling party who is more likely to have the call completed.

Complications also arise with callers that subscribe to distinctive ringing type services that provide a plurality of telephone numbers for the same subscriber line. The distinctive ringing service subscriber may reserve one number for important calls, which would be answered under most circumstances, while using another number for less important calls that the subscriber may choose to ignore.

Alternatively, each number may be associated with a different resident, the intended called party being indicated by the distinctive ring. In other circumstances a subscriber may require two telephone numbers for a single line to distinguish between business calls and personal calls. The business name would be listed for the business number, while the subscriber's name would be listed for the personal use number.

Conventionally, one of the listings for the multiple number line is recognized as a primary listing, the remainder as secondary listing(s). A called party subscriber to the basic caller ID service would receive from a multiple line calling subscriber a display of the caller's primary telephone number. A called party subscriber to the enhanced caller ID service would additionally have displayed the primary name associated with the primary number. The calling party may not wish to transmit the primary number and its associated listed name for a particular call. Depending upon the purpose of the call, a secondary number listing may be appropriate. A similar situation exists with a business subscriber who has a plurality of stations, each with a direct dial number. A caller from one of the stations may wish to select among several numbers to be displayed to the called party. The need thus exists for distinguishing between numbers, as well as names, for an individual call.

DISCLOSURE OF THE INVENTION

The present invention overcomes the above noted drawbacks of conventional systems and provides additional advantages in part by using capabilities of the advanced intelligent network (GAIN) to allow a calling party to specify what caller ID information to send to the called party for display. The term "caller ID" is used herein to refer generally to provision to a called party during the ringing signal phase of call processing, of information associated with the calling party. Information relevant to each subscriber is stored in the telephone system Line Identification Data Base (LIB). On an individual call basis, the calling subscriber can control what information is to be extracted from LIB if necessary to supplement data contained in the GAIN data base.

The advanced intelligent network contains a central data base, at an Integrated Service Control Point (ISCP), to which reference is made for controlling switching operations through multiple end offices. The central data base includes a plurality of Call Processing Records (CPRs), each associated with a subscriber. Local and/or toll offices of the public telephone network detect one of a number of call processing events, or triggers, both on incoming and outgoing calls to provide a wide variety of customized telephone services. When an GAIN capable office Service Switching Point (SSP) detects a trigger, that office suspends call processing, compiles a call data message, and forwards that message via a common channel interoffice signalling (CCIS) link, typically SS7, to the central data base. Reference is made therein to the appropriate CPR to obtain information necessary for completion of the call. For enhanced Caller ID service that provides name information in addition to the caller originating telephone number, the LIB data base is also accessed to retrieve appropriate information, which is translated into a call control message by the ISCP. The call control message is returned to the SSP office via CCIS link. The network offices then use the call control message to complete the call with the caller ID information transmitted. In accordance with one aspect of the present invention, the information to be retrieved from the LIB data base is selectable by the caller on a per call basis or by a default setting.

The LIB data base contains a record for each telephone subscriber that lists, inter alia, one or more telephone numbers and names that are relevant to the subscriber line. Ordinarily, i.e., in the absence of caller selection, a primary telephone number and a primary name listed in the calling subscriber's record are provided by default for a call placed to a caller ID subscriber. To change the information provided by default, the calling subscriber can establish a default setting in the associated CPR at the ISCP to indicate a listed telephone number and/or a listed name other than the primary listing that is to be conveyed with outgoing calls from the subscriber station. A default option may also include blocking transmission of the telephone number and/or name. Upon selection of a default setting, an originating trigger is set at the subscriber's end office SSP whereby the GAIN query process for retrieving the default information will be invoked for outgoing calls.

For an individual call, the calling subscriber may select identifying information from the subscriber LIB record that is different from the default information. Selection is made by dialing an access code in advance of the telephone number digits for the called party. Each access code may, for example, be an asterisk (*) followed by a unique number combination. One or more access code triggers, such as Office Dialing Plan (ODP) type triggers, are set in the local exchange serving the calling subscriber's telephone line. The access code is associated with an entry in the call processing record (CPR) of the subscriber stored at the ISCP. The entry for the dialed code may indicate that a different name and/or a different telephone number be extracted from the LIB data base for the call. Alternatively, the entry may indicate that either name or number is to be blocked and may additionally specify a different name or number to be extracted from the LIB data base. Correlation between code and specific information to be retrieved is preselected by the calling subscriber and may be changed at the subscriber's discretion. A plurality of codes representing various of the above described combinations may be in effect for an individual subscriber and represented in the subscriber's associated CPR.

After one of the access codes is dialed, the serving central office may provide a second dial-tone, to be followed by the caller's dialed destination digits. The central office, triggered by the access code, queries the ISCP for instructions. The ISCP, referencing the access code to the caller's CPR, retrieves appropriate information from the LIB data base. In a return message, the ISCP instructs the central office what information to put into the caller ID fields of subsequent signaling message(s) used to set-up the call to the destination and thus what caller ID information ultimately to provide to the calling party.

In an alternative embodiment, the ISCP may be triggered by the terminating end office SSP, i.e., the called party subscriber's office. The called party subscriber's feature profile, stored at this office switch, will indicate whether or not the called party subscribes to caller ID. Incoming calls, through common channel signaling, will identify the caller source, dialed destination telephone number, and dialed access code, if any. The terminating office will trigger the ISCP only if the called party subscriber profile includes caller ID. The caller's CPR is then accessed to obtain the appropriate information from the LIB data base for caller ID display. This embodiment avoids unnecessary usage of the GAIN network for calls to destinations that do not subscribe to caller ID.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
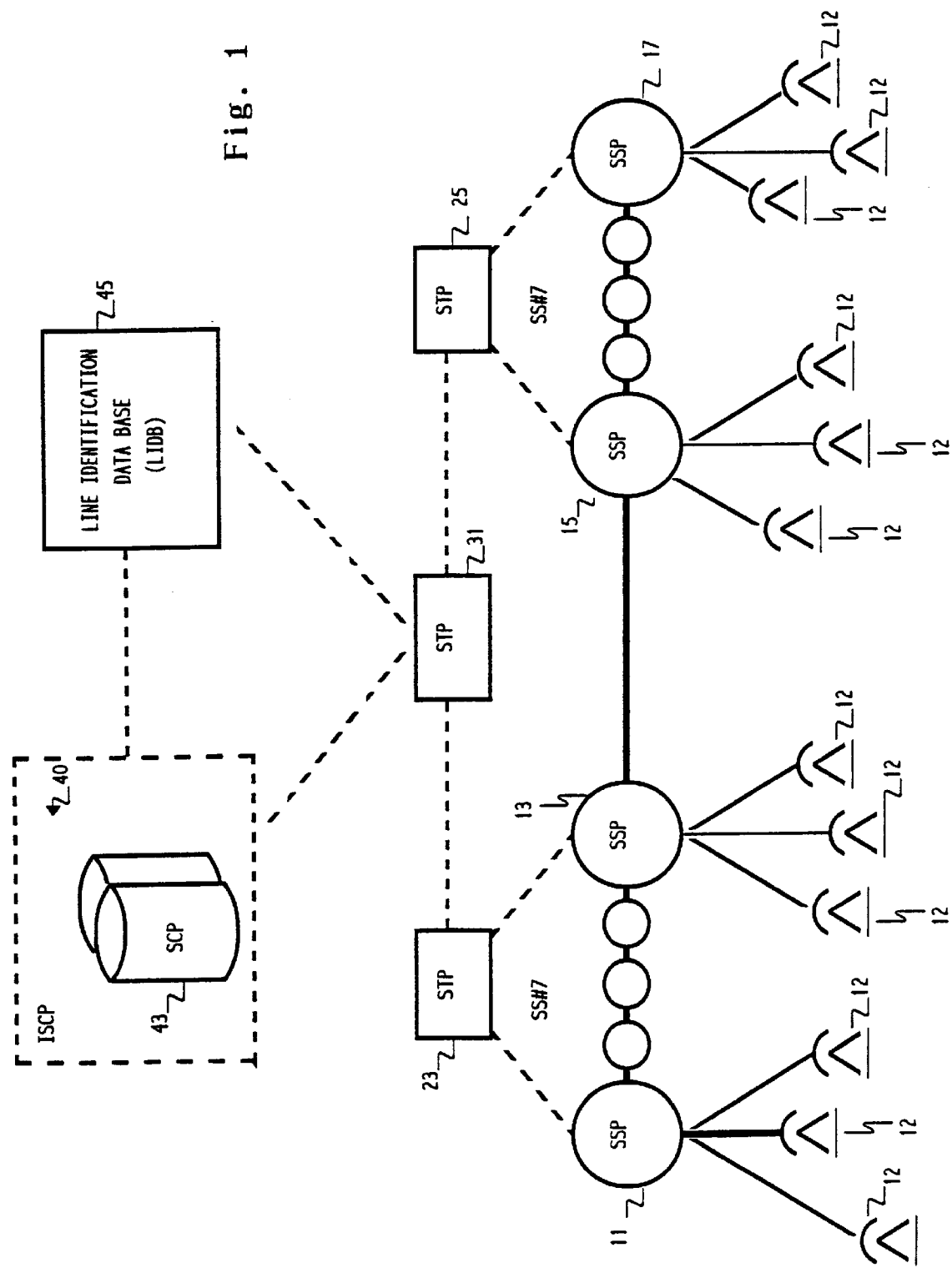
FIG. 1 is a block diagram of the present invention in the context of an Advanced Intelligent Network (GAIN).

FIG. 1 depicts the invention in an GAIN architectural environment. Rather than complicate the drawing with all details of the GAIN network that are well known, functional blocks are represented for description of the network as it relates to the present invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize GAIN type calls, launch queries to the ISCP and receive commands and data from the ISCP to further process the GAIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. The structure of an exemplary SSP type CO is discussed in more detail below, with regard to FIG. 2.

The SSP type COs 11 and 13 are shown connected to a first local area STP 23, SSP-COs 15 and 17 being connected to a second local area STP 25. The connections to the STPs are for signalling purposes. Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (GAIN) and to service any number of stations and central office switches. Also, certain switching offices within the network, whether SSPs or not, may function primarily as tandem type offices providing connections between trunk circuits only. Line identification data base (LIB) 45 is a telephone data base system that stores subscriber information files. The LIB data base is shown linked by data lines to ISCP 40 and STP 31. Although not shown, the LIB data base may be directly accessed also by other STPs.

The links between the central office switching systems and the local area STPs 23 and 25 are typically SS7 type CCIS interoffice data communication channels. The local area STPs are in turn connected to each other and to the regional STP 31 via a packet switched network. The regional STP 31 also communicates with the ISCP 40 via a packet switched network. As illustrated in the drawing, common channel signaling uses an out of band signaling path, indicated by dotted lines, that is separate from the path used for voice transmission, indicated by solid lines. This signalling technology provides for faster call set-up times and a more efficient use of the voice network than prior manual signaling, dial pulse signaling or multi-frequency signaling schemes wherein the trunk connecting the calling and the called subscribers required both signaling and voice transmission over the same circuitry. When a call is placed, the voice communication is suspended while signaling is transmitted through the common channel signaling network to check whether the line at the destination switch is busy and to determine the voice connection path.

The messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the copending application, Ser. No. 08/248,980, filed May 25, 1994, for a more detailed description of the GAIN network.

Figure 2:
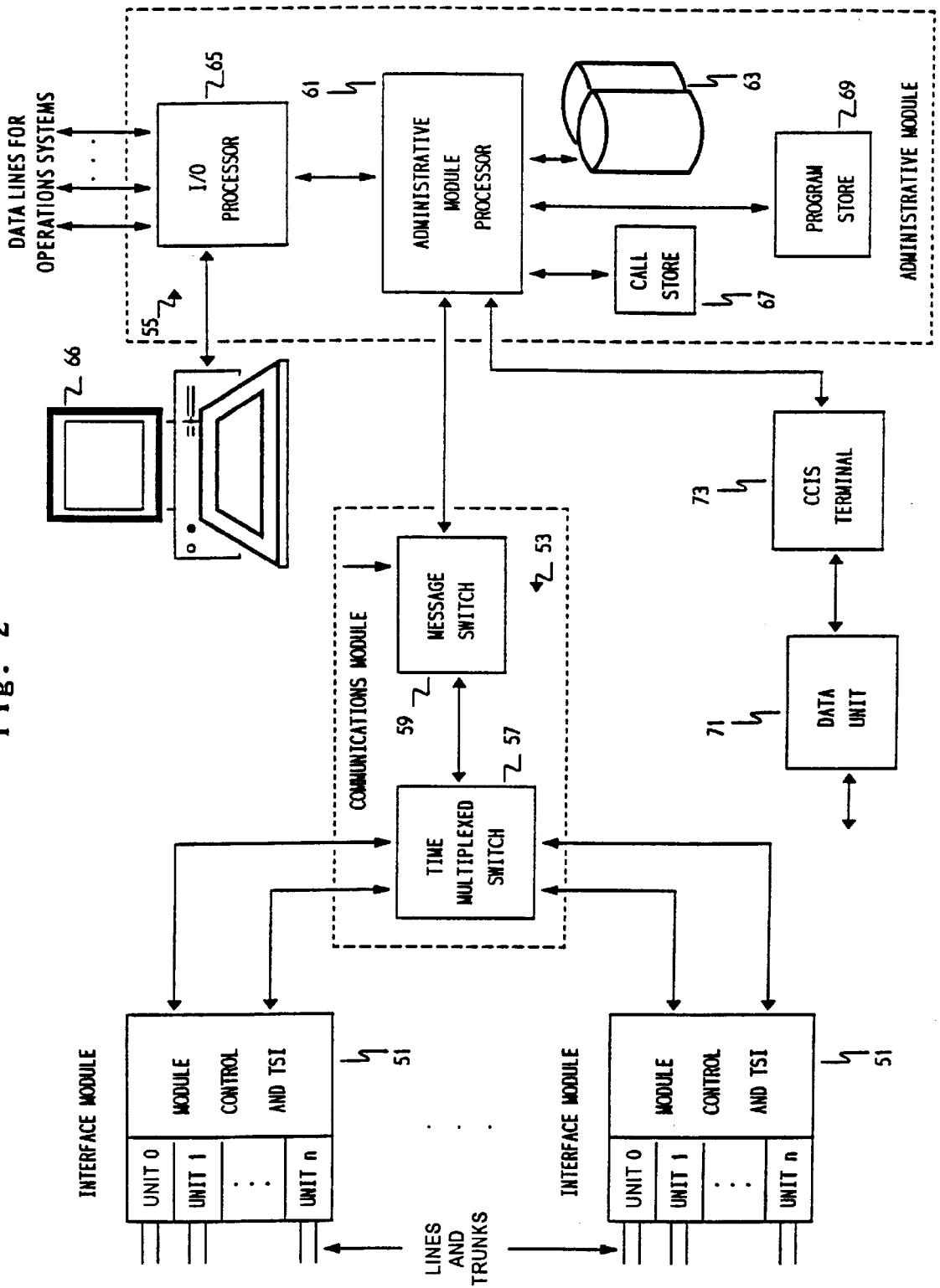
FIG. 2 is a more detailed diagram of one of the SSP type central offices used in the preferred GAIN implementation of the present invention.

FIG. 2 is a simplified block diagram of an electronic program controlled switch which may be used as any one of the SSP type COs in the system of FIG. 1. As illustrated, the CO switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc., that are physically wired to a main distribution frame (not shown) in the central office. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as TSI in the drawing. Digital words representative of voice information are transferred in two directions between interface units via the time slot interchange (intramodule call connections) or transmitted in two directions through the network control and timing links to the time multiplexed switch 57 and thence to is another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example, a link for receiving a synchronization carrier used to maintain digital synchronism.

The administrative module 55 includes an administrative module processor 61, which is a computer equipped with disc storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signalling link between is the administrative module processor 61 and an SS7 network connection to an STP or the like, as shown in FIG. 1, for facilitating call processing signal communications with other COs and with the ISCP 40.

The administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disc storage 63 together with routing information and any temporary information needed for processing the call. For example, for a switch based Centrex type service, the call store 67 would receive and store extension number translation information for the business customer corresponding to an off-hook line initiating a call. Translation tables, including subscribed class features are loaded into the store with each call. The program store 69 stores program instructions which direct operations of the computer serving as the administrative module processor.

Figure 3:
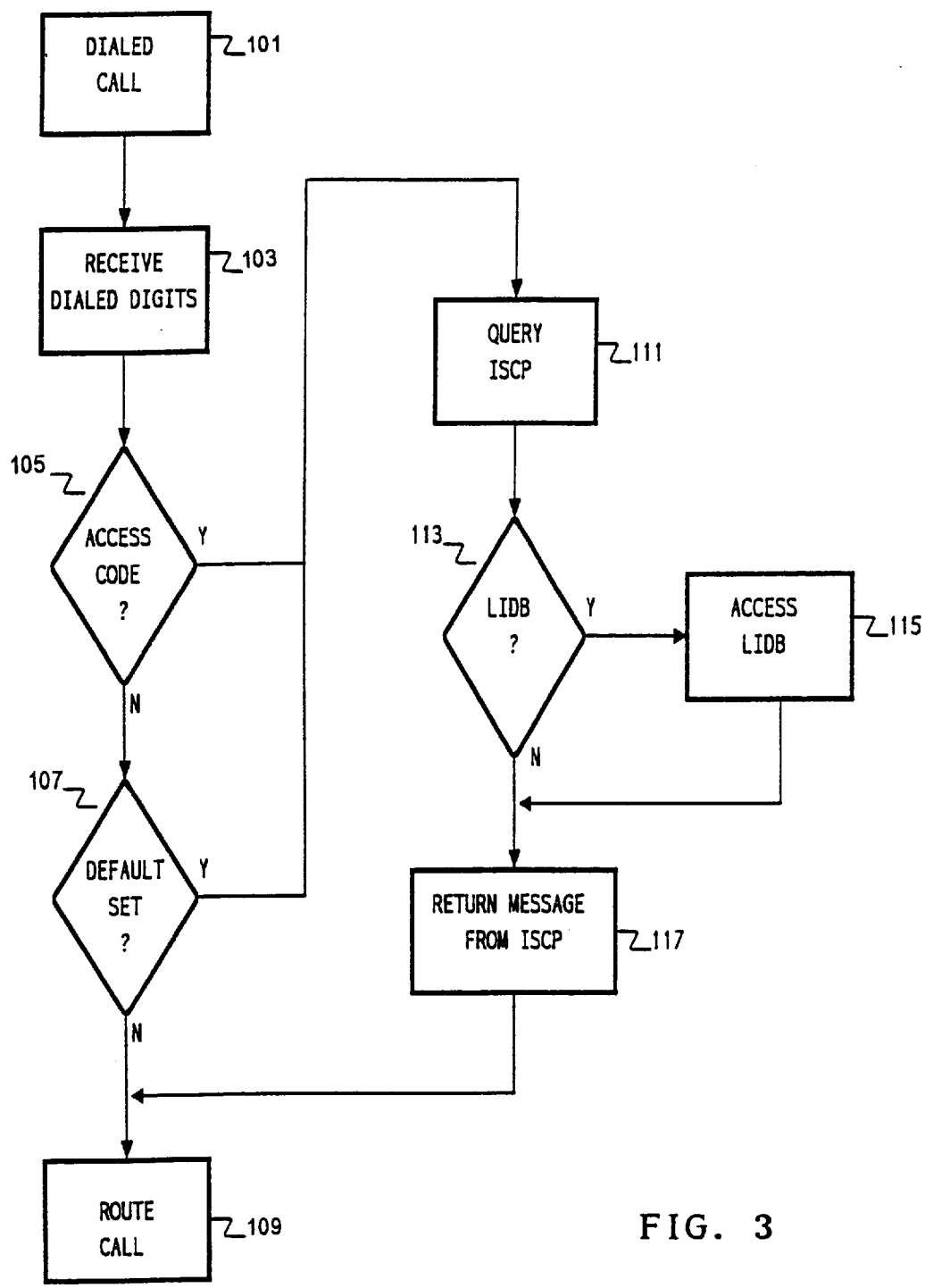
FIG. 3 is a flow chart that illustrates call processing in accordance with a first embodiment of the invention.

Processing of a call in accordance with a first embodiment of the invention is explained with reference to FIG. 3. At step 101, a call is dialed. The dialed digits are received at the caller's end office at step 103. If the caller is a subscriber to selective caller ID service, triggers corresponding to one or more access codes or to a selected default setting may exist in the caller's switch profile. At step 105, the caller's end office SSP determines whether an access code has been dialed. If not, and no default set trigger exists as determined at step 107, the call is processed and routed in conventional manner, step 109. For purposes of explanation of the present invention, it is assumed that no other service triggers for the calling party subscriber exist. If the called party subscriber end office SSP indicates caller ID or an enhanced caller ID feature, the calling party subscriber's listed telephone number and name information is made available for display at the called party's caller ID apparatus. The primary listing information for a calling party subscriber with multiple listings will be provided.

If an access code comprising a key sequence that matches a preset trigger in the caller's end office SSP profile has been dialed, the SSP suspends processing the call and forwards a TCAP message query through the data network to the ISCP, step 111. The ISCP refers to the calling subscriber's CPR to interpret the dialed access code to determine how to continue processing the call.

The dialed access code may be one of a plurality of codes for which triggers have been set in the SSP and that correspond to options set in the calling subscriber's CPR. As examples, "*60" may correspond to providing name in place of telephone number to the called station of a standard caller ID subscriber. This option is a counterpart to blocking caller telephone number identification (name only identification) to a called station of an enhanced caller ID subscriber. "*61" may correspond to providing an alternate LIB listing, "*62" may correspond to providing a second alternate listing, and so on for any number of alternate listings. The alternate listings may differ from each other by both name and telephone number or just one of the two identifiers.

The LIB data base contains all relevant identifying information for each subscriber line. In relatively noncomplex conditions, sufficient identifying information also exists in the ISCP. For example, a calling subscriber CPR may contain two telephone numbers associated with the caller line and no name identification is to be furnished to the called party. Thus, at step 113 a determination is made by the ISCP of whether the LIB data base is to be accessed. This determination is dependent upon the caller's stored CPR contents that correspond to the dialed access code and the makeup of the stored identifying information. If the ISCP requires further information, the LIB data base is accessed to provide the required data from the corresponding subscriber record, step 115. The ISCP, at step 117, then formulates a return message to the originating SSP to complete the call. The message may include routing instructions as well as the selected caller ID information. The call will then be routed in the manner of step 109.

Figure 4A:
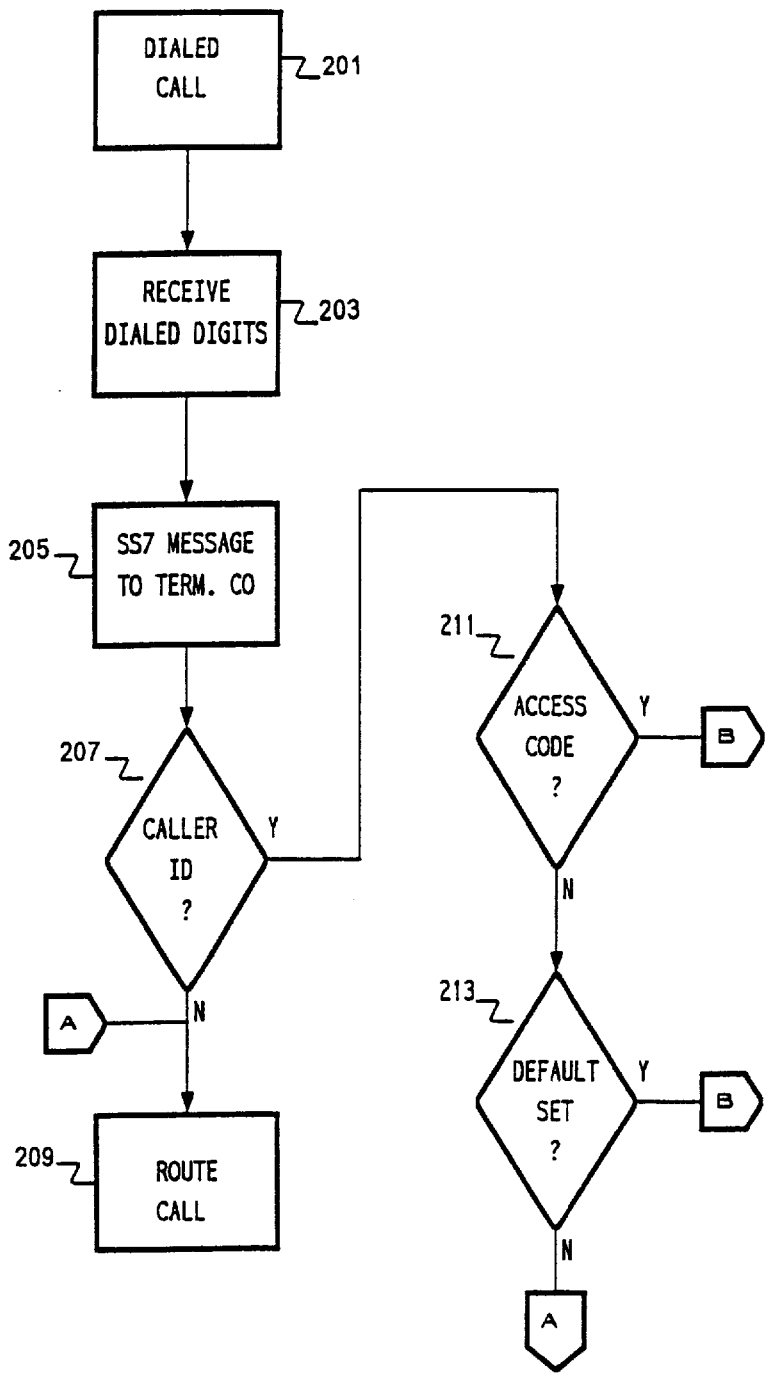
FIGS. 4A and 4B, taken in combination, comprise a flow chart that illustrates call processing in accordance with a second embodiment of the invention.
Figure 4B:
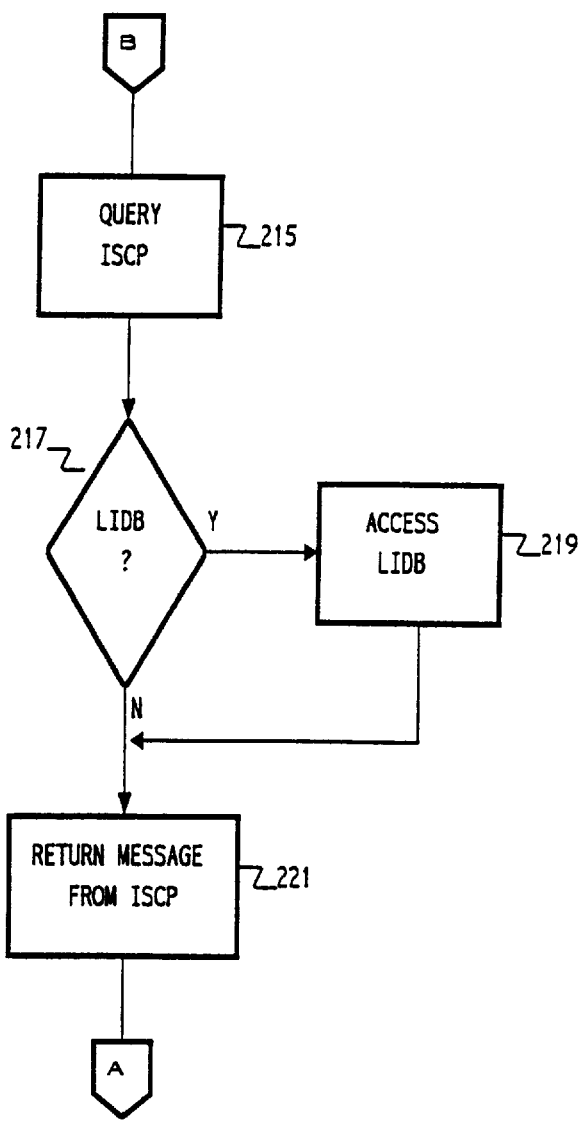

FIGS. 4A and 4B illustrate flow chart call processing operation in accordance with a second embodiment of the invention. At step 201 a call is dialed, the caller's originating end office SSP receiving the dialed digits at step 103. This embodiment differs from that of FIG. 3 in that the caller's SSP does not query the ISCP. Instead, the originating SSP forwards dialed digit information in an SS7 message to the called party, or terminating, SSP at step 205. If the called party subscriber switch profile does not indicate a caller ID subscription feature, determined at step 207, the call is routed in normal manner at step 209 without an unnecessary query to the ISCP and LIB access.

If the called party switch profile indicates a caller ID subscription feature, the terminating office SSP determines whether an access code has been dialed at step 211. If not, determination at step 213 is made of whether a default set trigger exists from the information received from the originating SSP. In the absence of thereof, the call is processed and routed in the manner of step 109.

If a dialed access code or a set default trigger has been detected, the terminating SSP suspends call processing and sends a TCAP query to the ISCP at step 215. The ISCP determines at step 217 whether the LIB data base is to be accessed on the basis of the calling party CPR. If the ISCP requires further information, the LIB data base is accessed to provide the required data from the corresponding subscriber record, step 219. The ISCP, at step 221, then formulates a return message, including appropriate caller ID information, to the terminating SSP to complete the call. The call will then be routed in the manner of step 209.

It should be appreciated that this embodiment promotes efficient use of the GAIN network. A calling party often will not know whether the party to be called has caller ID capability and thus may select a caller ID information option upon initiating a call. If a called party does not subscribe to caller ID, the ISCP and LIB data bases will not be invoked for caller ID information, even if the calling party has selected a caller ID information option.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. As an example, as a convenience to calling subscribers who may have several preset information options, the system can allocate a single access code to indicate selection of an option. With this modification, the ISCP could instruct the central office to route the call to a platform to play an announcement and collect selection digits. Using this procedure, the system could prompt the caller to select one of a plurality of caller ID options for use on the current call. The caller thus need not rely on accurately remembering the meaning of each of a plurality of access codes. The system would also benefit by conserving available access codes for use in other services.

As switch development becomes increasingly sophisticated, the system may be modified for direct access from the switch to the LIB data base, even for complex options. The need to invoke GAIN involvement would then be bypassed. As another example, the LIB data base subscriber record may include alternative textual materials, such as phrases. Caller ID selection options may substitute a stored phrase for the subscriber name.

We claim:

1. A method for supplying calling party information in an intelligent network to a called party station for an incoming telephone call comprising the steps of:
   receiving, at a location remote from said calling party station, input dialed at said calling party station, said input including a telephone number of said called party station;
   detecting whether said dialed input additionally includes an access code; in response to detection of said access code in said detecting step, suspending completion of the call;
   accessing a data base separate from the remote location to obtain one identification from a plurality of identifications associated with the calling party station, the one identification being predesignated by the calling party to be associated with the access code;
   routing the call to said called party station; and
   transmitting the information associated with the access code as the calling party information from said remote location to said called party station.

2. A method as recited in claim 1, wherein said information associated with the access code identifies one of a plurality of telephone numbers assigned to said calling party station.

3. A method as recited in claim 1, wherein said information associated with the access code identifies one of a plurality of names associated with said calling party station stored at said remote location.

4. A method as recited in claim 3, wherein said information associated with the access code further identifies one of a plurality of telephone numbers assigned to said calling party station.

5. In a public switched telephone network having a plurality of subscriber telephone lines with respective stations, each coupled to an associated telephone switching facility, a service control point remotely located from said telephone lines and connected to the associated switching facilities through a common channel signaling network, and a line information data base (LIB) system accessible via said common channel signaling network, a method for processing a telephone call placed from a calling subscriber line station to a called subscriber line station comprising the steps of:
   obtaining input from said calling subscriber line station at the switching facility associated with said calling subscriber line, said input comprising an access code;
   in response to said input, suspending completion of said call;
   accessing said service control point;
   extracting one identification from a plurality of identifications associated with the calling subscriber line station from said LIB system, the one identification being predesignated by the calling subscriber line station to be associated with the access code;
   routing the call to said called subscriber line station; and
   transmitting said extracted information to said called subscriber line station.

6. A method as recited in claim 5, wherein said LIB system comprises a data base with a stored file for said calling subscriber line, said file having a plurality of identifying entries, and said step of extracting information comprises selecting one of said entries by direction of said service control point.

7. A method as recited in claim 6, wherein said entries comprise a plurality of telephone numbers assigned to said calling subscriber line.

8. A method as recited in claim 6, wherein said entries comprise a plurality of names assigned to said calling subscriber line.

9. A method as recited in claim 6, wherein said step of suspending is responsive to a trigger set in the switching facility associated with said calling subscriber line and said step of accessing comprises initiating communication between the calling line subscriber associated switching facility and said service control point.

10. A method as recited in claim 9, wherein said trigger is an off-hook trigger indicative of a preselected default setting in said service control point.

11. A method as recited in claim 9, wherein said trigger is an access code trigger that corresponds to a caller selectable identifying information option stored in the calling subscriber call processing record in said service control point, said trigger activated in response to a preset dialed sequence contained in said input.

12. A method as recited in claim 11, wherein said call processing record contains a plurality of caller selectable identifying information options, each corresponding to a different access code trigger.

13. A method as recited in claim 11, wherein said option indicates one of a plurality of telephone numbers assigned to said calling subscriber line station.

14. A method as recited in claim 11, wherein said option indicates one of a plurality of names assigned to said calling subscriber line station.

15. A method as recited in claim 5, wherein said step of suspending is responsive to a trigger set in the switching facility associated with said called subscriber line and said step of accessing comprises initiating communication between the called line subscriber associated switching facility and said service control point.

16. In a public switched telephone network having a plurality of subscriber telephone lines with respective stations, each coupled to an associated telephone switching facility, a service control point remotely located from said telephone lines and connected to the associated switching facilities through a common channel signaling network, and a line information data base (LIB) system accessible via said common channel signaling network, a method for processing a telephone call placed from a calling subscriber line station to a called subscriber line station comprising the steps of:

obtaining input from said calling subscriber line station at the switching facility associated with said calling subscriber line;

transmitting said input through said common channel signaling network to the switching facility associated with said called subscriber line;

in response to a determination that said called subscriber line is a caller ID subscriber, accessing a call processing record of the calling subscriber line stored in said service control point;

extracting one identification from a plurality of identifications associated with the calling subscriber line station, from said LIB system, in accordance with said input by direction of said service control point, the one identification being predesignated by the calling subscriber line station to be associated with said input;

routing the call to said called subscriber line station; and transmitting said extracted information to said called subscriber line station.

17. A method as recited in claim 16, wherein said LIB system comprises a data base with a stored file for said calling subscriber line, said file having a plurality of identifying entries, and said step of extracting information comprises selecting one of said entries by direction of said service control point.

18. A method as recited in claim 17, wherein said entries comprise a plurality of telephone numbers assigned to said calling subscriber line.

19. A method as recited in claim 17, wherein said entries comprise a plurality of names assigned to said calling subscriber line.

20. A method as recited in claim 16, wherein said step of extracting comprises selecting information in accordance with an access code contained in the input dialed by the caller.

21. An intelligent communication system comprising:

a calling party station;

a called party station;

a plurality of separately located central office switching systems interconnected via trunk circuits for selectively providing switched telephone call communications between the calling party station and the called party station, at least one of said central office switching systems acting as a service switching point, wherein said service switching point receives input dialed at the called party station, said input including a telephone number of the called party station;

an integrated service control point, separate from the central office switching systems, the integrated service control point having a database containing a plurality of call processing records including a record associated with the calling station, said record associated with the calling station comprising an access code; and an identification data base with a plurality of identifications associated with the calling party station, one of the plurality of identifications being predesignated by the calling party station to be associated with the access code, wherein the one of the identifications is transmitted to the called party station upon detection of the access code within the input dialed at the called party station.

* * * * *